United States Patent
Karakawa et al.

(10) Patent No.: US 6,870,803 B2
(45) Date of Patent: Mar. 22, 2005

(54) INFORMATION STORAGE APPARATUS AND INFORMATION REPRODUCING METHOD FOR REDUCING CROSS TALK FROM A REGION ADJACENT A RECORDED INFORMATION MARK

(75) Inventors: Yuji Karakawa, Kawasaki (JP); Shigenori Yanagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 383 days.

(21) Appl. No.: 09/820,537

(22) Filed: Mar. 29, 2001

(65) Prior Publication Data

US 2002/0054555 A1 May 9, 2002

(30) Foreign Application Priority Data

Nov. 9, 2000 (JP) .......................................... 2000-342274

(51) Int. Cl.[7] ................................................. G11B 3/90
(52) U.S. Cl. ............................... 369/53.33; 369/53.15; 369/47.17; 369/116
(58) Field of Search .......................... 369/53.33, 47.17, 369/116, 53.15

(56) References Cited

U.S. PATENT DOCUMENTS

| | | | | |
|---|---|---|---|---|
| 4,833,665 A | * | 5/1989 | Tokumitsu et al. ...... | 369/53.17 |
| 5,986,997 A | * | 11/1999 | Challener, IV ............. | 369/121 |
| 5,991,252 A | * | 11/1999 | Kimura et al. ........... | 369/59.12 |
| 6,018,507 A | * | 1/2000 | Takeda et al. ............. | 369/111 |
| 6,128,270 A | * | 10/2000 | Nishikawa ............... | 369/275.4 |
| 6,165,579 A | * | 12/2000 | Nakamura ................. | 428/64.1 |
| 6,266,201 B1 | * | 7/2001 | Dahlerud et al. ............. | 360/53 |
| 6,310,846 B1 | * | 10/2001 | Fuji ........................ | 369/53.31 |
| 6,324,660 B1 | * | 11/2001 | Majima et al. ............. | 714/710 |
| 6,333,913 B1 | * | 12/2001 | Yoshinari et al. ........... | 369/283 |
| 6,407,979 B1 | * | 6/2002 | Matsumoto et al. ..... | 369/275.4 |
| 6,671,240 B2 | * | 12/2003 | Karakawa et al. ....... | 369/53.15 |

FOREIGN PATENT DOCUMENTS

| | | |
|---|---|---|
| EP | 316 188 | 5/1989 |
| EP | 903 731 | 3/1999 |
| JP | 57-53844 | 3/1982 |
| JP | 05225643 | 9/1993 |
| JP | 06-302033 | 10/1994 |

* cited by examiner

Primary Examiner—Gautam R. Patel
(74) Attorney, Agent, or Firm—Greer, Burns & Crain, LTD (57) ABSTRACT

An information storage apparatus includes a mark reading section for reading a mark written on an information storage medium. A recording state changing section is provided for changing a recording state in an adjacent region situated next to a region from which the mark reading section fails to read a mark, so as to reduce cross talk caused by the adjacent region. The mark reading section reads the mark in the failed region again after the recording state changing section changes the recording state in the adjacent region.

8 Claims, 9 Drawing Sheets

Fig. 14

INFORMATION STORAGE APPARATUS AND INFORMATION REPRODUCING METHOD FOR REDUCING CROSS TALK FROM A REGION ADJACENT A RECORDED INFORMATION MARK

BACKGROUND OF THE INVENTION (i) Field of the Invention

The present invention relates to an information storage apparatus and an information reproducing method for reproducing information recorded on an information storage medium.

(ii) Description of the Related Art

As a high-density information storage medium for recording and reproducing sound data or image data, an optical storage medium or a magnetic storage medium is known. Spiral or concentric tracks are typically provided on such an information storage medium, and these tracks are divided into a plurality of regions which are generally called sectors. Also, there is known an information storage apparatus which records information by writing marks in these sectors by a magnetic field or heat or an information storage apparatus which reproduces information by reading the marks by the magnetic field or heat.

With recent improvement in the computer technology, a data size or a quantity of sound data or image data to be used is increasing and enhancement of recording density of the information storage medium is eagerly desired. Narrowing the track pitch is demanded in order to greatly improve the recording density of the information storage medium.

As a technique for narrowing the track pitch, there is proposed one called land and groove recording by which information is recorded on both flute-like grooves and protruding lands alternately provided on the storage medium.

Figure 1:
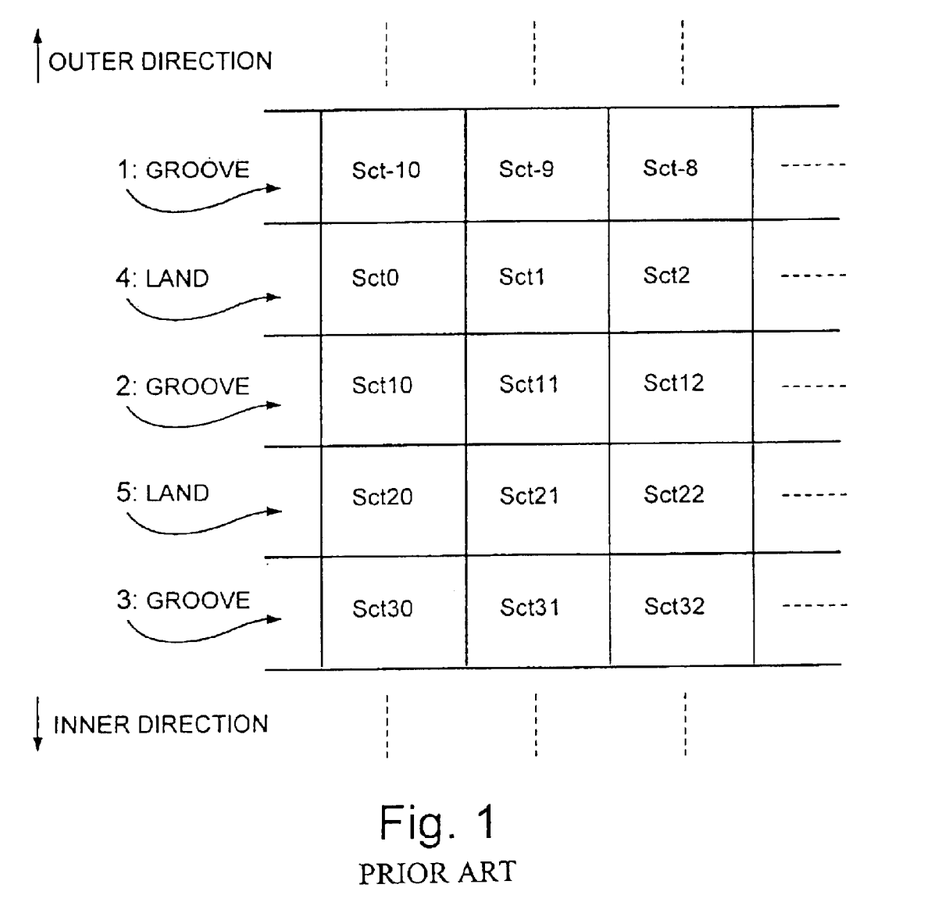
FIG. 1 is a view showing sectors on an information storage medium adopting land and groove recording.

FIG. 1 is a view showing sectors on an information storage medium adopting the land and groove recording.

FIG. 1 illustrates three grooves 1, 2 and 3 and two lands 4 and 5 alternately provided with respect to these grooves 1, 2 and 3. Both the grooves 1, 2 and 3 and the lands 4 and 5 are used as tracks, and a plurality of sectors are provided to each track. Numbers for differentiating the sectors are given to these multiple sectors. For example, the -10th sector Sct-10, the -ninth sector Sct-9, the -eighth sector Sct-8, . . . , the 10th sector Sct10, the 11th sector Sct11, the 12th sector Sct12, . . . , the 30th sector Sct30, the 31st sector Sct31, the 32nd sector Sct32, . . . are provided on the three grooves 1, 2 and 3 in the drawing, and the 0th sector Sct0, the first sector Sct1, the second sector Sct2, . . . , the 20th sector Sct20, the 21st sector Sct21, the 22nd sector Sct22, . . . are provided to the respective two lands 4 and 5. That is, serial numbers are given to respective sectors provided in one track, and numbers given to a sector are different by 10 from those given to another sector adjacent to the former in a transverse direction of the tracks. Further, the number given to the sector is increased toward the central direction (inner direction) of the information storage medium and decreased toward the outer peripheral surface (outer direction).

In this manner, both the grooves and the lands are used as tracks in the land and groove recording. Therefore, the track pitch in a technique such that only lands are used as tracks is, e.g., 0.9 μm, whereas the track pitch in the land and groove recoding is an extremely narrow pitch, i.e., 0.65 μm. The recording density can be greatly increased if the linear recording density remains unchanged. Accordingly, the above-described technique is very important for realizing the high-density recording.

However, if the land and the groove recording and the like is adopted to greatly narrow the track pitch, when reading a mark on a given track, cross talk caused due to a mark on a track adjacent to that track prevents the mark from being read. For example, when reading the mark recorded in the 11th sector Sct11 in FIG. 1, cross talk occurs due to the mark in the first sector Sct1 or the mark in the 21st sector Sct21.

Figure 2:
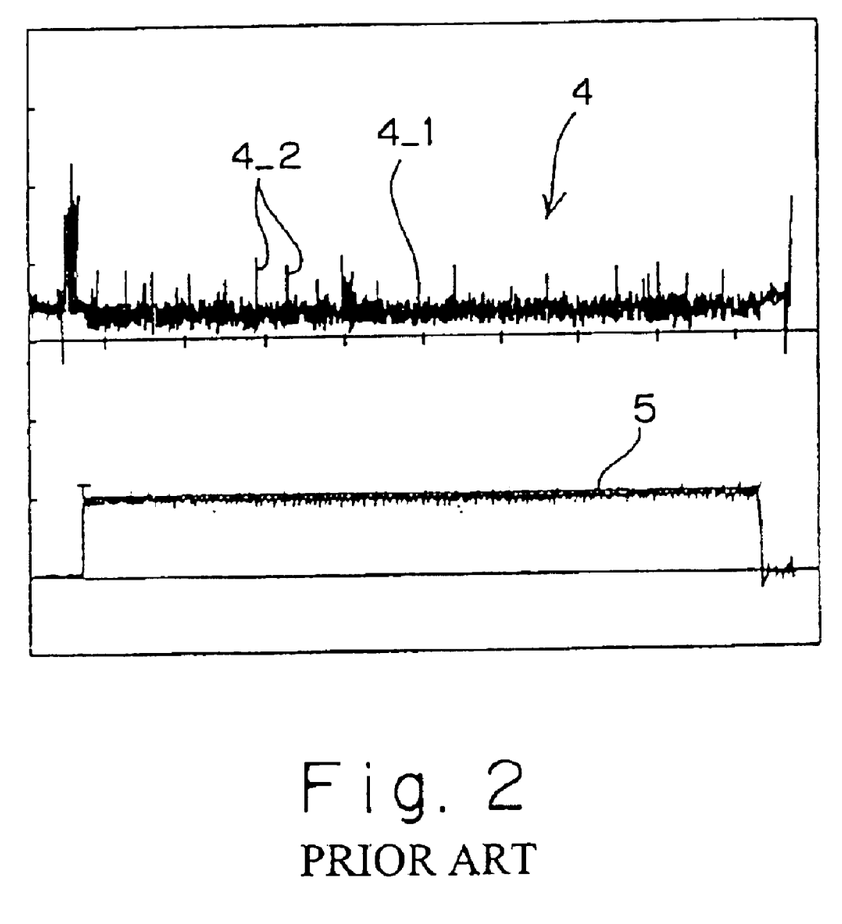
FIG. 2 is a graph showing an example of cross talk.

FIG. 2 is a graph showing an example of cross talk.

The upper part in FIG. 2 shows a signal waveform of a read signal obtained when performing reading with respect to a sector in erase state having no mark therein. A mark is written in a sector adjacent to the sector in erase state in a transverse direction of the tracks.

Further, the lower part of the FIG. 2 graph shows a gate signal indicative of a significant part in the read signal. In the signal waveform of the read signal shown in the upper part of the graph, only a portion corresponding to a time interval during which the waveform of the gate signal shown in the lower part rises is a significant signal waveform.

A flat waveform and a spike-like waveform exist in the signal waveform of the read signal, and the flat waveform is indicative of a signal caused due to a sector in erase state and the spike-like waveform is indicative of cross talk owing to a sector on an adjacent track. The signal intensity of such cross talk may be strong such that the signal is hardly differentiated from an original read signal. In such a case, a mark in a sector as a read target is prevented from being read.

Although the above-described problem prominently occurs in an optical disk device adopting the land and groove recording in particular, it occurs not only in such a device but it is typically generated in an information storage apparatus for reproducing information on an information storage medium having a narrow track pitch.

SUMMARY OF THE INVENTION

In view of the above-described drawback, an object of the present invention is to provide an information storage apparatus and an information reproducing method capable of reading marks without being disturbed by cross talk even if a track pitch is narrow.

Adopting the technique according to the present invention enables normal reading of a mark even if a track pitch is narrowed, and realization of high density of an information storage medium can be hence advanced.

To this end, an information storage apparatus according to the present invention comprising:

a mark reading section for reading a mark written on an information storage medium, said information storage medium which has a recording area divided into a plurality of regions, on which information is recorded by writing a mark, and from which information is reproduced by reading the recorded mark; and a recording state changing section for changing a recording state in an adjacent region situated next to a failed region from which said mark reading section fails to read a mark among a plurality of said regions, if said mark reading section fails to read said mark, so that cross talk caused due to said adjacent region can be reduced, said mark reading section again reading a mark in said failed region after changing a recording state in said adjacent region by said recording state changing section.

The term "region" used herein may be a generally called sector, a block consisting of a plurality of sectors, or multiple divided sectors. Further, the sector may be arclike or linear.

According to the information storage apparatus of the present invention, since the recording state in an adjacent region is changed so that cross talk caused due to the adjacent region can be reduced, a mark in a failed region can be normally read.

The recording state changing section of the information storage apparatus according to the present invention may erase a mark written in an adjacent region, or it may write on an overwriting basis in an adjacent region a mark generating lower cross talk than that caused due to a mark written in that adjacent region.

Here, "a mark generating lower cross talk" may be any mark as long as cross talk is substantially lower than that of an existing mark. For example, it may be a mark obtained by rewriting under appropriate write conditions an existing mark having cross talk increased due to a change in a mark form with passage of time after writing, or a mark having a length shorter than that of an existing mark in an adjacent region, or a mark having a width narrower than that of the existing mark. Moreover, a mark having a narrower width than that of an existing mark can be readily realized by writing a mark with power weaker than that used for writing the existing mark.

According to the information storage apparatus of the present invention, it is preferable that the recording state changing section changes a recording state in an adjacent region after evacuating information recorded in the adjacent region and restores the evacuated information in the adjacent region after again reading a mark in a failed region by the mark reading section.

If the information is recorded in the adjacent region, effacement of the information due to a change in the recording state can be avoided by evacuating and restoring the information before and after change of the recording state in the adjacent region.

Further, according to the information storage apparatus of the present invention, it is desirable that "said information storage medium includes an alternative region used in place of said region according to needs, said recording state changing section performing evacuation of information recorded in said adjacent region to said alternative region and registration of use of said alternative region instead of said adjacent region before changing a recording state in said adjacent region."

Since use of the alternative region instead of the adjacent region is registered before changing the recording state, normal use of the information storage medium can be guaranteed even if a failure occurs in the adjacent region when changing the recording state and the like.

To achieve the above-described object, an information reproducing method according to the present invention comprising:

mark reading step of reading a mark written in an information storage medium, said information storage medium having a recording area divided into a plurality of regions, information being recorded by writing a mark in said region and reproduced by reading said mark;

recording state changing step of changing a recording state in an adjacent region situated next to a failed region from which a mark fails to be read in said mark reading step among a plurality of said regions, if said mark reading step fails to read said mark, so that cross talk caused due to said adjacent region can be reduced; and mark rereading step of again reading said mark in said failed region after changing a recording state in said adjacent region in said recording state changing step.

Although only a basic mode of the information reproducing method is disclosed herein in order to simply avoid tautological explanation, the information reproducing method includes various types of information reproducing method associated with each mode of the above-described information storage apparatus as well as the basic mode of the information reproducing method.

DETAILED DESCRIPTION OF THE PREFERRED EMBODIMENT

An embodiment according to the present invention will now be described hereinafter. In the following description, terms "information" and "data" may not be differentiated from each other in some cases.

Figure 3:
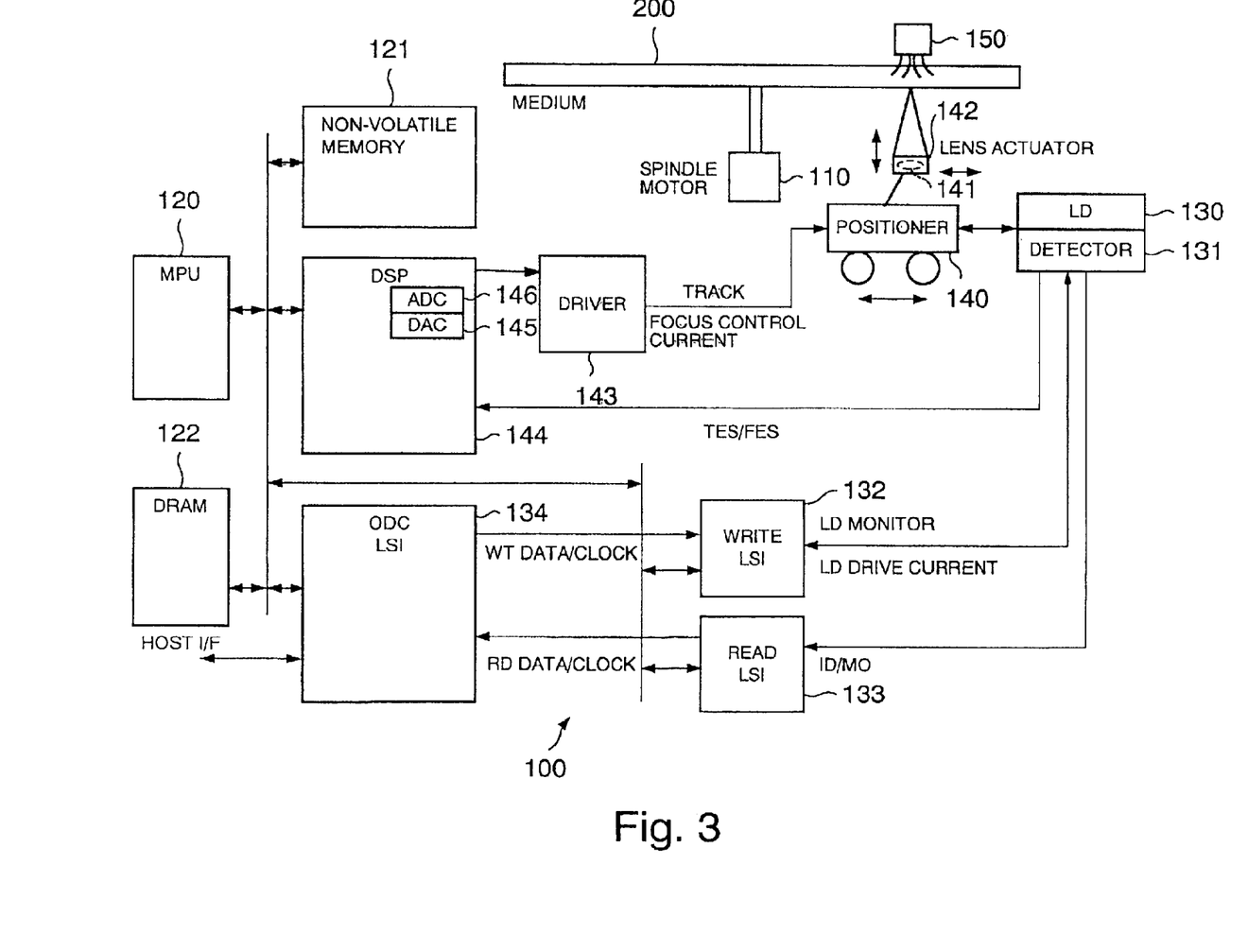
FIG. 3 is a view showing an MO disk device incorporating a function as an embodiment of an information storage medium according to the present invention.

FIG. 3 is a view showing an MO disk device incorporating a function as an embodiment of the information storage apparatus according to the present invention.

This MO disk device 100 uses a magnetic optical (MO) disk as an information storage medium 200, and a recording area of the information storage medium 200 is divided into such sectors as shown in FIG. 1. These sectors are an example of the regions according to the present invention. Further, a DMA (Defect Management Area) including spare sectors is provided in the information storage medium 200.

Figure 4:
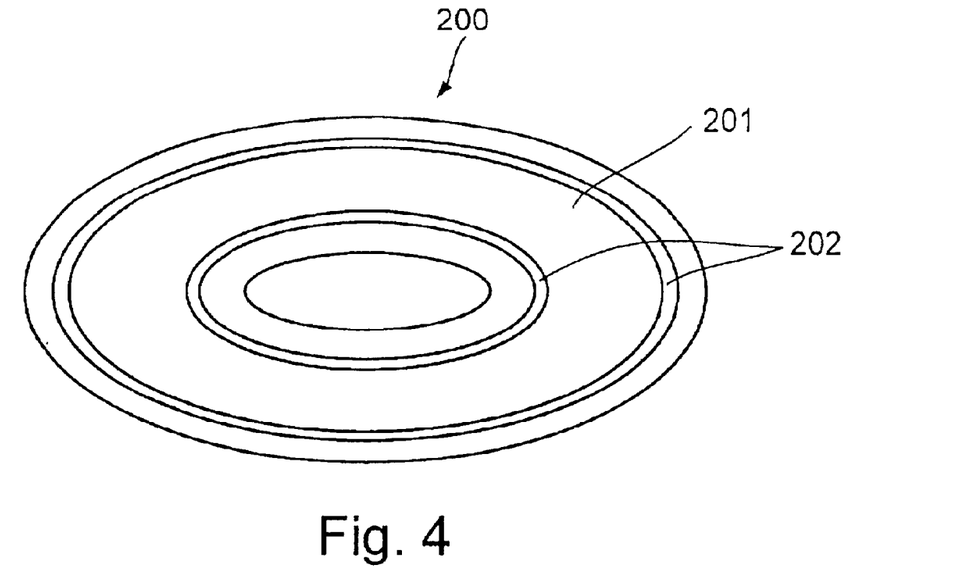
FIG. 4 is a view showing a DMA provided on an information storage medium.

FIG. 4 is a view showing a DMA provided on the information storage medium.

A usual recording area 201 is provided in the annular form on the information storage medium 200, and DMAs 202 are provided along the inner periphery and the outer periphery of the recording area 201. The DMA 202 includes an alternative area consisting of a set of sectors used as backups of sectors included in the usual recording area 201, and use of a sector constituting an alternative area instead of a sector included in the regular recording area 201 is registered in the DMA 202. The sector constituting the alternative area is an example of the alternative region according to the present invention.

FIG. 3 is again referred to continue explanation.

The information storage medium 200 is held by a spindle motor 110. Revolution drive of the spindle motor 110 is controlled by an MPU (Micro Processor Unit) 120. The MPU 120 operates in accordance with a program stored in a non-volatile memory 121 and utilizes a DRAM 122 as a working area.

Further, the MO disk device 100 is provided with a laser diode unit 130 and a laser beam having a predetermined intensity is emitted from the laser diode unit 130 during reproduction of information. The intensity of the laser beam is monitored by a monitor photodetector included in a detector group 131 and controlled by a write circuit 132 based on a monitor signal obtained by the monitor photodetector. The laser beam is incident upon the information storage medium 200 by an object lens 141 mounted on a positioner 140, thereby generating a reflected light ray associated with a mark recorded on the information storage medium 200. The reflected light ray is accepted by an ID/MO detector included in the detector group 131 to detect an ID signal and an MO signal. The ID signal and the MO signal are inputted into a read circuit 133 to be converted into reproduction data and a clock signal for data analysis. The laser diode unit 130 or the read circuit 133, therefore, constitutes an example of the mark reading section according to the present invention. The reproduction data obtained by the read circuit 133 is fed to an interface of a host device such as a computer through an optical disk controller 134.

On the other hand, at the time of recording information, recording data is supplied from the interface of a host device through the optical disk controller 134 and inputted together with a clock signal for writing data into the write circuit 132. In initialization (formatting) of the information storage medium 200, formatted data is generated by the optical disk controller 134 to be inputted together with the clock signal for writing data into the write circuit 132. The write circuit 132 is controlled by the MPU 120 via a bus and operates in synchronism with the clock signal for writing data. Additionally, the write circuit 132 modulates the recording data and the formatted data to be converted into a laser diode drive current. The laser diode drive current is inputted into the laser diode unit 130 where a laser beam is emitted.

In recording information and formatting, an electric current is supplied to an electromagnet 150 so that a recording magnetic field is generated on the information storage medium 200. Information is recorded on the information storage medium 200 or the information storage medium 200 is formatted by the recording magnetic field and heat of the laser beam associated with the above-described write signal.

The electromagnet 150, the laser diode 130, the write circuit 132, the object lens 141 and the MPU 120 constitute an example of the recording state changing section according to the present invention.

Further, the MO disk device 100 is provided with a lens actuator 142 for driving the object lens 141, and the above-mentioned positioner 140 having the object lens 141 and a lens actuator 142 mounted thereon moves along the surface of the surface storage medium 200. A track focus control current is supplied to the positioner 140 and the lens actuator 142 by a driver 143 so that these members are controlled. The driver 143 outputs a track focus control current associated with a control signal inputted from a DSP (Digital Signal Processor) 144 via a D/A conversion circuit 145. The DSP 144 fetches and analyzes through an A/D conversion circuit 146 a tracking error signal (TES) and a focus error signal (FES) obtained by the detector group 131 and inputs a control signal based on a result of analysis to the driver 143.

A program showing the operation of the DSP 144 is also stored in the non-volatile memory 121, and the DRAM 122 is also used as a working space of the DSP 144.

Description will now be given as to read retry processing which is executed if mark reading has failed with reference to flowcharts.

Figure 5:
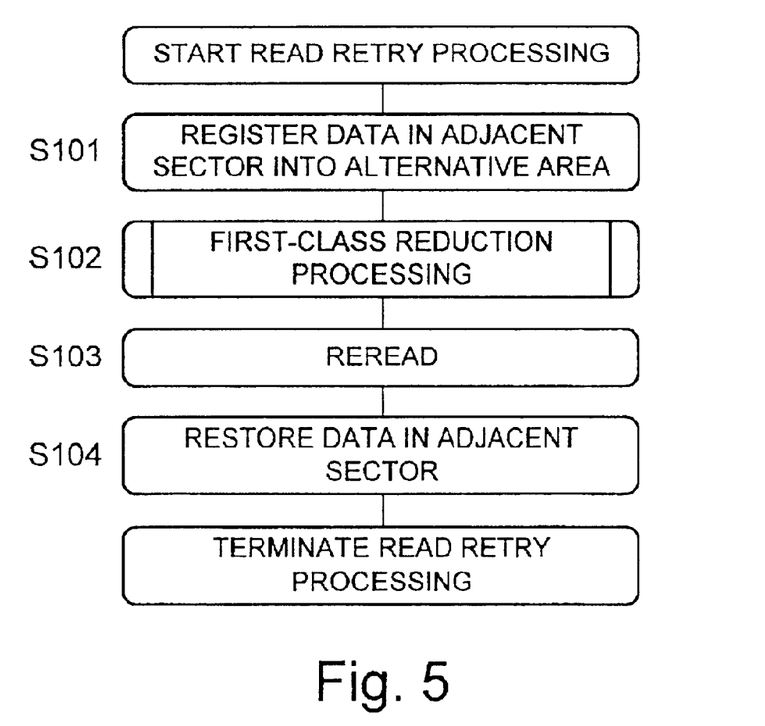
FIG. 5 is a flowchart showing a first example of read retry processing.

FIG. 5 is a flowchart showing a first example of the read retry processing.

When the first example of the read retry processing starts, data in a sector adjacent to a failed sector from which the MO disk device 100 has failed to read a mark among the sectors on the information storage medium 200 is registered in an alternative area to be evacuated (step S101). First-class reduction processing which reduces cross talk caused due to the adjacent sector and involves destruction of data recorded in the adjacent sector is executed (step S102). The content of the first-class reduction processing will be described later.

After execution of the first-class reduction processing, a mark in the failed sector is again read (step S103), and data in the adjacent sector is restored (step S104) to terminate the read retry processing.

According to such read retry processing, cross talk caused due to the adjacent sector is reduced to enable a mark to be normally read.

As the first-class reduction processing executed in the step S102, processing such as described below can be considered for example.

As a first example of the first-class reduction processing, erasing processing for erasing a mark written in the adjacent sector is possible. This erasing processing is a simple process and capable of assuredly reducing cross talk since a mark itself which can be a cause of cross talk is erased.

As a second example of the first-class reduction processing, there can be considered overwriting processing for writing on an overwriting basis in the adjacent sector a mark which generates cross talk having a lower level than that of cross talk caused by a mark written in that adjacent sector. In case of an MO disk, erasing and writing of a mark are performed as the overwriting processing, and verification of the mark may be also executed according to needs. As a mark to be written in the adjacent sector by this overwriting processing, a mark having a length or a width smaller than that of a mark written in the adjacent sector can be considered for instance. As described above, the first-class reduction processing involves destruction of data recorded in the adjacent sector, and due to writing predetermined dummy data previously stored in, e.g., a ROM for overwriting the adjacent sector under predetermined writing conditions, a mark having a length or width smaller than that of an existing mark can be obtained. A length of a mark can be adjusted by a light emission time and the like of the laser diode 130 shown in FIG. 3. Further, the width of a mark can be adjusted by temperature control over a film of an MO disk, and this temperature control can be realized when the laser power of the laser diode 130 is controlled in accordance with an environment temperature.

At the step S102, when a mark is rewritten in accordance with the second example of the first-class reduction processing, a mark having a mark length or a mark width with which cross talk can be sufficiently reduced is written in the adjacent sector. However, when the mark has again failed to be read in the failed sector at the step S103, it is desirable that the laser power of the laser diode 130 is reduced by, e.g., a several % so that rewriting of the mark is again executed.

Figure 6:
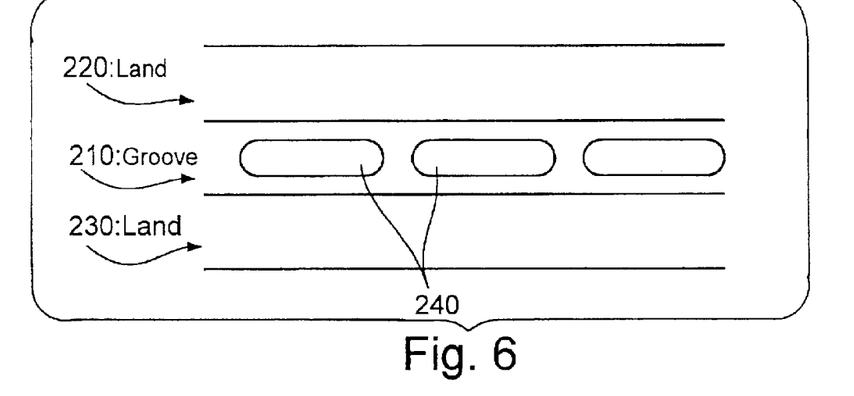
FIG. 6 is a view showing marks having a long mark length.
Figure 7:
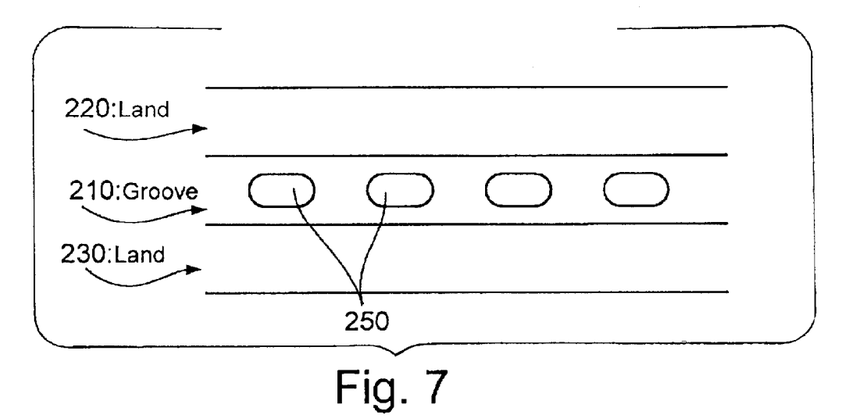
FIG. 7 is a view showing marks having a short mark length.

FIG. 6 is a view showing marks having a long mark length, and FIG. 7 is a view showing marks having a short mark length.

FIGS. 6 and 7 show one groove 210, and two lands 220 and 230 sandwiching the groove 210, marks 240 and 250 being written on the groove 210. Here, a maximum value (for example, 8T) and a minimum value (for example, 2T) are determined for the length of the mark recorded on the information storage medium. The mark 240 shown in FIG. 6 is a mark having a long mark length close to the maximum value of the mark length, and the mark 250 illustrated in FIG. 7 is a mark having a short mark length close to the minimum value of the mark length. The mark having the maximum mark length is likely to produce cross talk most, and cross talk is hardly generated as the mark length of the mark becomes shorter. Accordingly, the mark 250 having a short mark length such as shown in FIG. 7 generates cross talk whose level is lower than that of cross talk produced by the mark 240 having a long mark length such as shown in FIG. 6.

Therefore, by writing the mark having the shorter mark length than the mark written in the adjacent sector for overwriting that adjacent sector, cross talk can be reduced.

Figure 8:
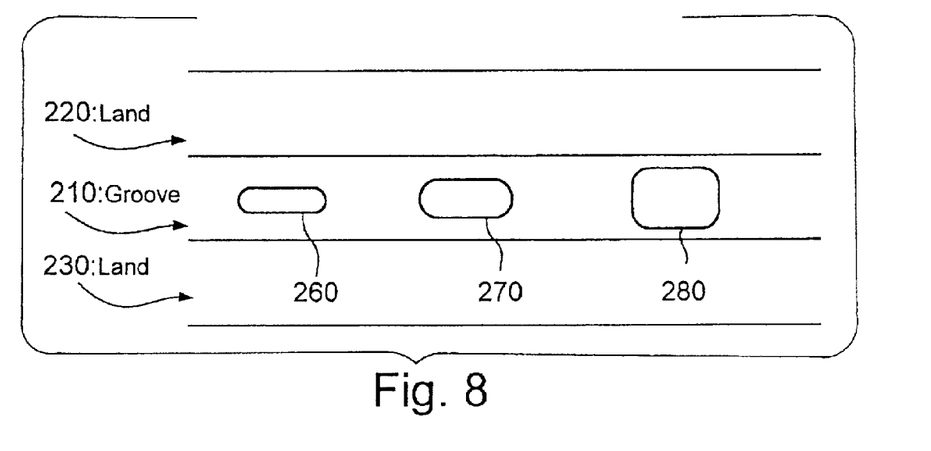
FIG. 8 is a view showing marks having different mark widths.

FIG. 8 is a view showing marks having different mark lengths.

As similar to FIG. 6 or 7, FIG. 8 shows one groove 210 and two lands 220 and 230 sandwiching the groove 210. Here, three marks 260, 270 and 280 having different mark lengths are also shown on the groove 210. In regard to the laser power used when the three marks 260, 270 and 280 are respectively written, the laser power used when the mark 260 having the narrowest mark width is written is weakest, whereas the laser power used when the mark 280 having the widest mark width is written is strongest. Additionally, as to the level of cross talk due to each of the three marks 260, 270 and 280, the level of cross talk due to the mark 260 having the narrowest mark width is lowest, whereas the level of cross talk due to the mark 280 having the widest mark width is highest.

Therefore, cross talk can be reduced by writing the mark having the narrower mark width than that of the mark written in the adjacent sector for overwriting that adjacent sector. Such a mark having the narrow mark width can be realized by overwriting the mark by using power weaker than that used when writing the mark in the adjacent sector. It is to be noted that write power for each sector may be stored and a mark may be overwritten by power weaker than that write power. Alternatively, a mark may be overwritten with power lower than current appropriate power for simplification. The appropriate power is updated with a predetermined timing.

Figure 9:
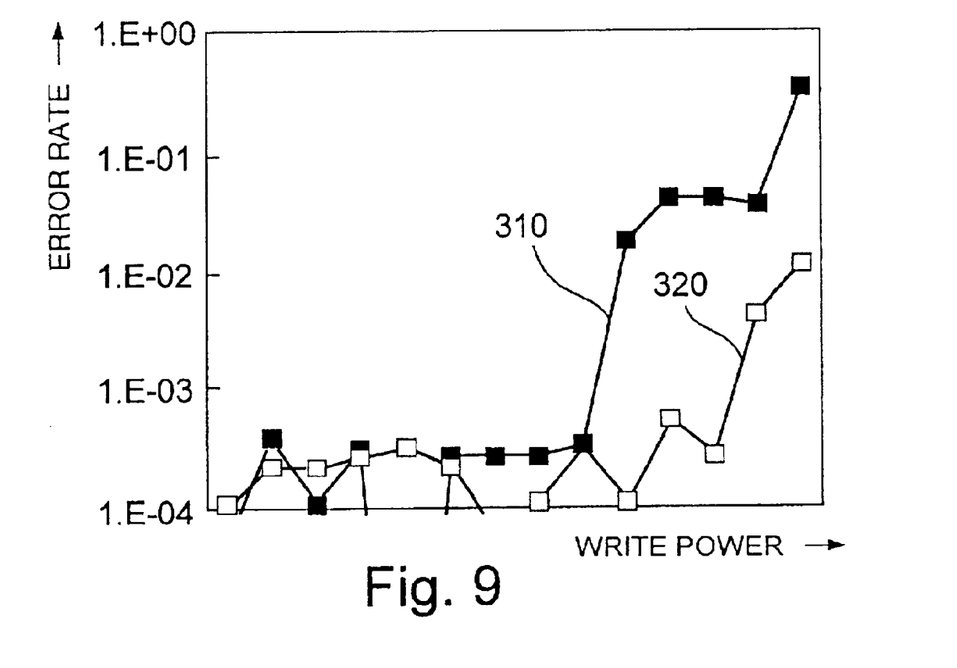
FIG. 9 is a graph illustrating an advantage of a second example of first-class reduction processing.

FIG. 9 is a graph illustrating the advantage of the second example of the first-class reduction processing.

The horizontal axis of this graph represents power used when the mark is written, and the vertical axis of the same indicates an error rate of the read error generated when reading a mark in a sector adjacent to a sector in which the mark is written. Further, a line chart 310 with black squares represents measurement results relative to the long mark 240 shown in FIG. 6, and a line chart 320 with outline squares represents measurement results relative to the short mark 250 illustrated in FIG. 7.

An allowable level of the error rate is typically approximately $10^{-3}$, and both the error rate indicated by the line chart 310 with black squares and the error rate indicated by the line chart 320 with outline squares become equal to or far below the allowable level when the power is low to some extent. Accordingly, by overwriting a mark in the adjacent sector with the power which is low to some extent, normal mark reading is assured in a failed sector right next to the adjacent sector.

Moreover, the upper limit of the power range indicating the error rate obtained when the line chart 320 with outline squares is not more than the allowable level exceeds the upper limit of the power range indicating the error rate obtained when the line chart 310 with the black squares is not more than the allowable level. Therefore, even if the power used for writing the mark is strong, writing a short mark for overwriting the adjacent sector can assure normal mark reading in a failed sector right next to the adjacent sector.

If a factor which has caused reading of a mark in the failed sector to fail is cross talk, the possibility of restoration by the first-class reduction processing can be considered to be 90% to 100%.

Although cross talk of the adjacent sector can be reduced by the first-class reduction processing in this manner, data recorded in the adjacent sector is destroyed in the first-class reduction processing.

On the other hand, according to second-class reduction processing described below, cross talk of the adjacent sector is reduced and data recorded in the adjacent sector can be maintained.

Generally, data recorded in a sector is represented by a length or an interval of a mark written in that sector, and it is often the case that a width of the mark is independent of data. Therefore, in the second-class reduction processing, a mark which has a length or an interval equal to those of a mark written in an adjacent sector, has a width narrower than that of the mark and is capable of being normally read is written on an overwriting basis in that adjacent sector. As a result, cross talk of the adjacent sector can be reduced, and data recorded in the adjacent sector can be maintained.

It can be considered that such second-class reduction processing can be realized by simply rewriting a mark in the adjacent sector with laser power suitable for writing the mark. That is because reading a mark in the failed sector is prevented by cross talk caused due to a mark in the adjacent sector, namely, it can be considered that the mark in the adjacent sector has a width larger than that of a mark written with the appropriate laser power.

Such a mark having a large mark width can be generated under conditions such as described below.

Since a width of a mark written in an MO disk changes in accordance with a temperature of a film or an intensity of a recording magnetic field of the MO disk, laser power appropriate for writing a mark is determined in accordance with an environment temperature or an intensity of a recording magnetic field. However, if the environment in which a mark in the adjacent sector is written is close to an allowable limit, a mark having a large mark width may be possibly written even if the mark is written with the appropriate laser power.

Moreover, a size of a written mark is not fixed, and there is known a phenomenon such that a size of a mark is increased with lapse of time. Such a phenomenon may possibly cause a mark with a large width to be generated in the adjacent sector when reading a mark in the failed sector even if the mark in the adjacent sector is written with a sufficiently small width.

The mark with the large mark width generated in such a circumstance is rewritten with laser power appropriate for writing the mark at the present time to become a mark having a sufficiently small mark width, and it can be considered that cross talk can be sufficiently reduced. However, when secure reduction in cross talk is desired, laser power which is lower than the appropriate laser power by a several % may be adopted for example, or laser power may be reduced multiple number of times within a range enabling writing until rereading in the failed sector proves successful.

It can be considered that the possibility of restoration by such second-class reduction processing is 90% to 100%.

Figure 10:
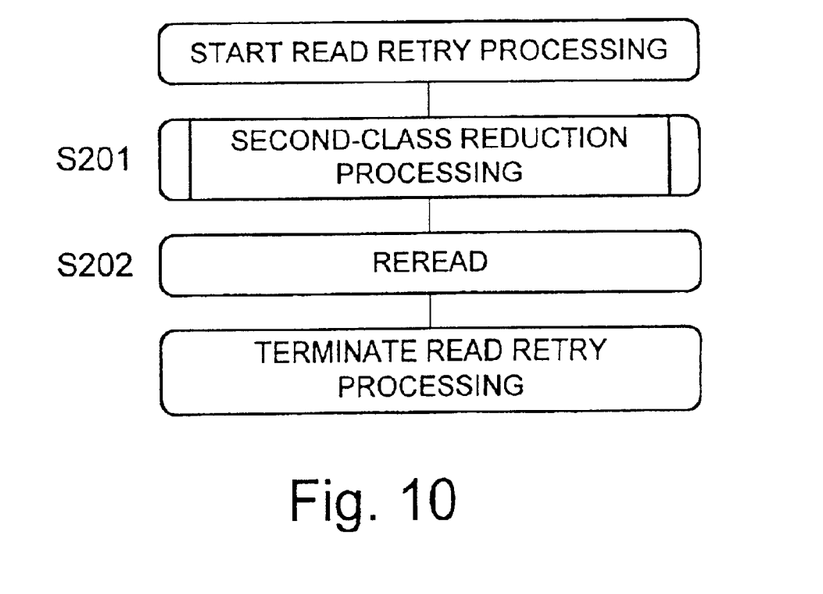
FIG. 10 is a flowchart showing a second example of the read retry processing.

FIG. 10 is a flowchart showing the second example of read retry processing.

In the second example of the read retry processing, the above-described second-class reduction processing is executed (step S201), and a mark in the failed sector is again read (step S202) so that the read retry processing is terminated without making any change.

In the above-mentioned second-class reduction processing, since data in the adjacent sector is maintained, evacuation and restoration of data in the adjacent sector are unnecessary.

Figure 11:
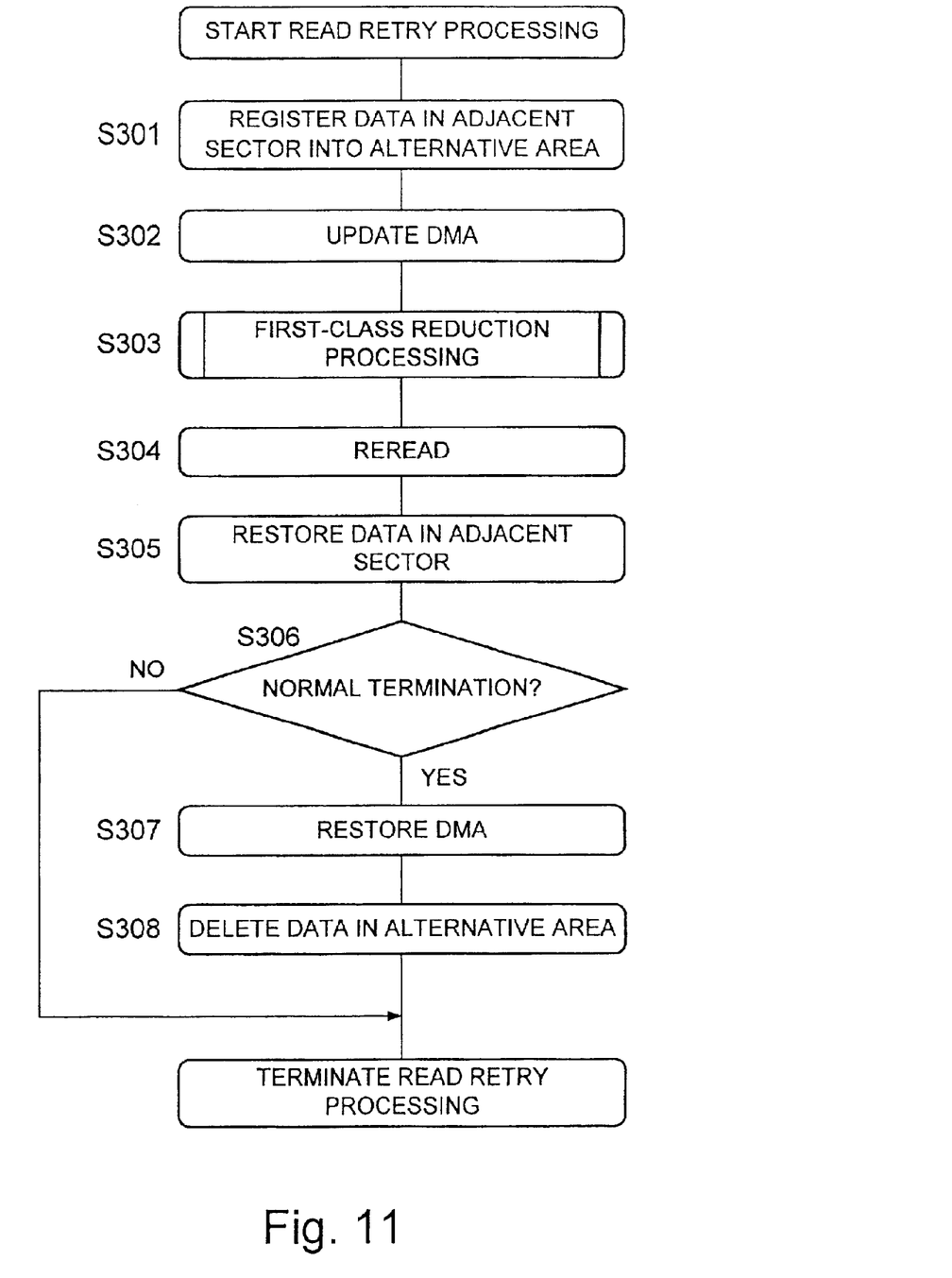
FIG. 11 is a flowchart showing a third example of the read retry processing.

FIG. 11 is a flowchart showing the third example of read retry processing.

Upon starting the third example of the read retry processing, data in the adjacent sector is registered in the alternative area and evacuated (step S301), and use of the sector in the alternative area instead of the adjacent sector is registered in the DMA so that the DMA is updated (step S302). Subsequently, the above-described first-class reduction processing is executed (step S303), and a mark in the failed sector is again read (step S304) so that data in the adjacent sector is restored (step S305).

When the data in the adjacent sector is normally restored (step S306: Yes), registration in the step S302 is canceled to update the DMA (step S307), and the data registered in the alternative area is deleted (step S308). As a result, overuse of the alternative area is avoided.

On the other hand, if the data in the adjacent sector can not be restored (step S306: No), the read retry processing is terminated with registration in the step S301 and the step S302 being maintained. This guarantees normal reproduction including the data recorded in the adjacent sector.

Figure 12:
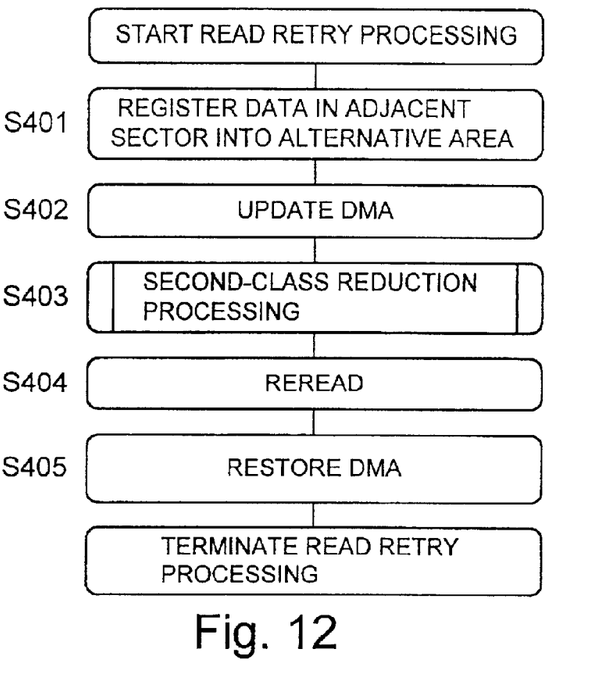
FIG. 12 is a flowchart showing a fourth example of the read retry processing.

FIG. 12 is a flowchart showing the fourth example of the read retry processing.

Figure 13:
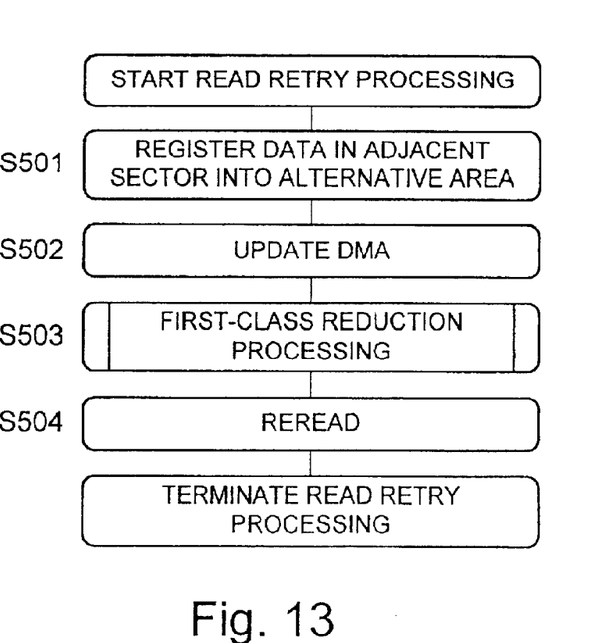
FIG. 13 is a flowchart showing a fifth example of the read retry processing.

When the fourth example of the read retry processing shown in FIG. 12 starts, data in the adjacent sector is registered in the alternative area (step S401) and use of a sector in the alternative area in place of the adjacent sector is registered in the DMA so that the DMA is updated (step S402), as similar to the third example of the read retry processing shown in FIG. 13. Thereafter, the above-mentioned second-class reduction processing is executed (step S403), and a mark in the failed sector is again read (step S404). Subsequently, registration in the step S402 is canceled to restore the DMA (step S405), thereby completing the read retry processing.

As described above, in the second-class reduction processing, since the data in the adjacent sector is maintained, registration in the step S401 and the step S402 is seemingly unproductive. Abnormal termination may be, however, caused due to interruption of power supply and the like during the second-class reduction processing. If registration in the step S401 and the step S402 has been executed, data on the information storage medium is safe even though such abnormal termination occurs. In other words, the fourth example of the read retry processing shown in FIG. 12 has very high safety of data.

FIG. 13 is a flowchart showing the fifth example of the read retry processing.

In the fifth example of the read retry processing shown in FIG. 13, data in the adjacent sector is registered in the alternative area (step S501), and use of a sector in the alternative area instead of the adjacent sector is registered in the DMA so that the DMA is updated (step S502). Thereafter, the above-described first-class reduction processing is executed (step S503), and a mark in the failed sector is again read (step S504). The procedure described thus far is completely the same as that of the third example of the read retry processing illustrated in FIG. 11, but the read retry processing is terminated without any change in the fifth example.

Since the adjacent sector is a sector generating strong cross talk which prevents a mark in other sector from being read, restoring data in this sector may again prevent the mark from being read. In the fifth example, therefore, the read retry processing is terminated with cross talk in the adjacent sector being reduced and with the adjacent sector being substituted by the sector in the alternative area.

Figure 14:
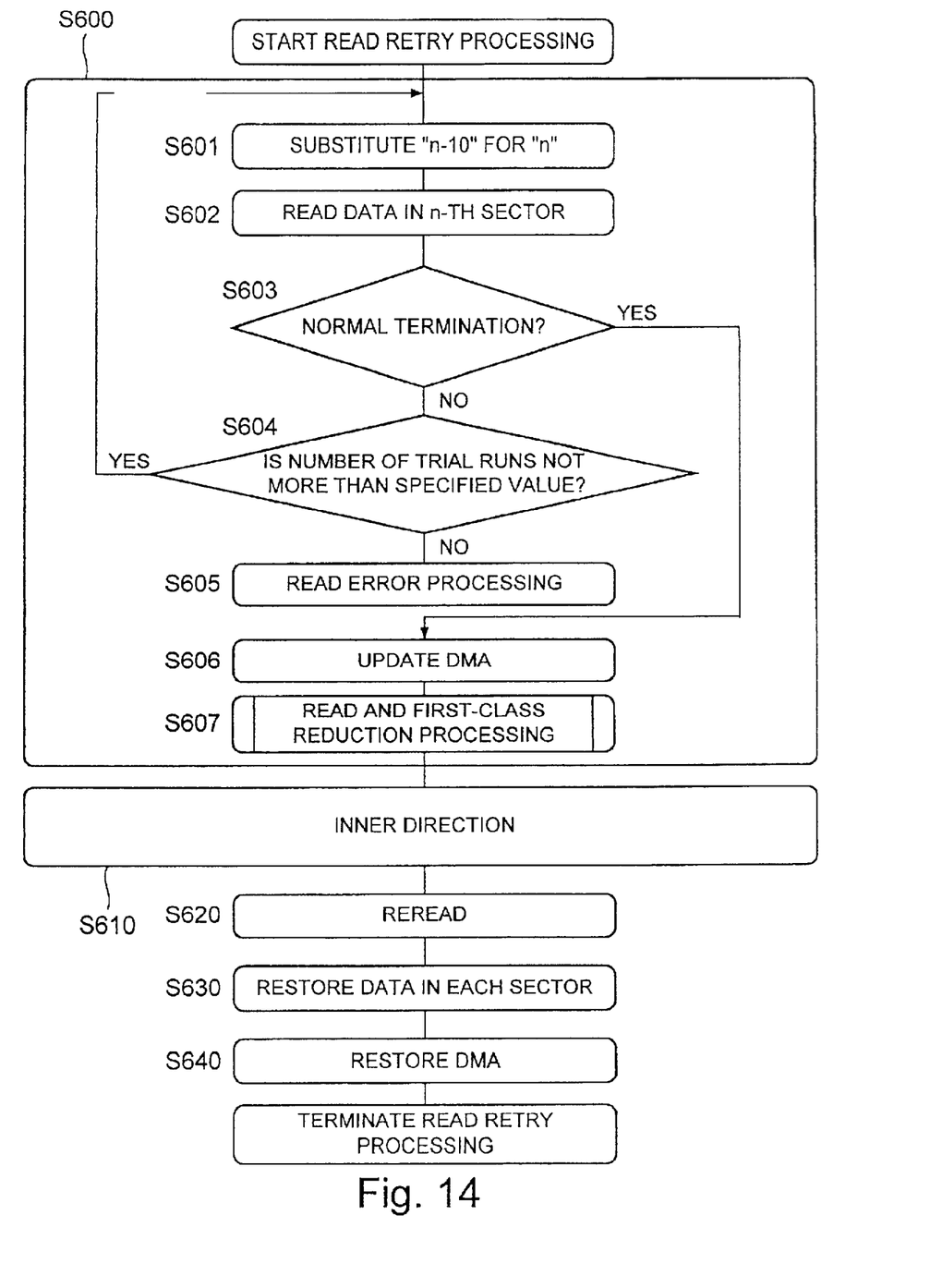
FIG. 14 is a flowchart showing a sixth example of the read retry processing.

FIG. 14 is a flowchart showing the sixth example of the read retry processing.

In order to register data in the adjacent sector in the alternative area, data in the adjacent sector must be reproduced. It can be considered that data reproduction in the adjacent sector may be prevented by cross talk generated by a sector right next to that adjacent sector.

Therefore, in the sixth example of the read retry processing depicted in FIG. 14, starting from the failed sector from which a mark first failed to be read, mark reading is sequentially executed shifting to adjacent sectors until mark reading proves successful with respect to each of the outer peripheral direction and the central direction of the information storage medium (steps S600 and S610).

In the step S600, a number given to the failed sector from which a mark first failed to be read is determined as an initial value having a variable n. By reducing the variable n by 10, a number indicative of a sector adjacent to the outer peripheral side is obtained (step S601), and a mark in the n-th sector is read (step S602). When mark reading has failed (step S603: No), control returns to the step S601 as long as a number of trial runs for mark reading is within a predetermined value (step S604: Yes), and the similar procedure is repeated with respect to the sectors on the outer peripheral side. If a number of trial runs for mark reading has exceeded the predetermined value (step S604: No), it is determined that normal mark reading is no longer possible and the read error processing is executed (step S605).

In the step S603, if it is determined that mark reading has been normally terminated, use of sectors in the alternative area is registered in the DMA in place of a series of sectors from a sector adjacent to the failed sector on the outer peripheral side to a sector from which normal reading has finally proved successful, and the DMA is updated (step S606). Mark reading, data evacuation and the first-class reduction processing are executed with respect to each of a series of these sectors (step S607). As a result, cross talk of all of these sectors is reduced.

In the step S610, the procedure similar to the step S600 is effected to a series of sectors which exist in a direction close to the center rather than the failed sector.

As described above, starting from the failed sector, data of a series of the sectors is evacuated in each of the outer peripheral direction and the central direction of the information storage medium, and cross talk of these sectors can be reduced.

Thereafter, a mark in the failed sector can be again read (step S620), and data of a series of the sectors is restored (step S630). Further, the DMA is also restored (step S640), thereby terminating the read retry processing.

According to the sixth example of such read retry processing, even if sectors generating strong cross talk are continuous, marks in the sectors can be normally read.

Although data in, e.g., the adjacent sector is evacuated to the alternative area in the foregoing embodiment, the information storage apparatus according to the present invention may evacuate data to a place other than the alternative area.

Further, laser power has been illustrated as power for writing a mark in the foregoing embodiment, but the power according to the present invention may be, for example, an intensity of a magnetic field.

Although the above embodiment has employed the optical storage type magneto-optical disk as the information storage medium, the information storage medium according to the present invention may be a magneto-optical disk adopting each storage mode such as magneto-optic recording, phase change recording and magnetic recording, or any other disk type storage medium such as an optical disk or a magnetic disk, or a card or tape type storage medium.

The region according to the present invention may be a sector illustrated in the foregoing embodiment, or a block consisting of a plurality of sectors, or multiple divided sectors.

As described above, according to the information storage apparatus of the present invention, a mark can be read without being disturbed by cross talk even if a track pitch is as narrow as 0.65 μm or lower.

If the technique according to the present invention is used, a mark can be normally read even though a track pitch is narrowed, thereby high density of the information storage medium can be advanced.

What is claimed is:

1. An information storage apparatus comprising:
a mark reading section for reading marks written on an information storage medium having a plurality of regions in which information marks are written, said regions being linearly shaped and extending parallel to each other; and
a recording state changing section for changing a recording state in an adjacent region extended next to a failed region from which said mark reading section fails to read a mark, to reduce cross talk caused by said adjacent region if said mark reading section fails to read said mark,
wherein said mark reading section again reads the mark in said failed region after changing the recording state in said adjacent region by said recording state changing section.

2. The information storage apparatus according to claim 1, wherein said recording state changing section erases a mark written in said adjacent region.

3. The information storage apparatus according to claim 1, wherein said recording state changing section writes on an overwriting basis in said adjacent region a mark generating cross talk lower than cross talk caused due to a mark written in said adjacent region.

4. The information storage apparatus according to claim 1, wherein said recording state changing section writes on an overwriting basis in said adjacent region a mark having a length shorter than that of a mark written in said adjacent region.

5. The information storage apparatus according to claim 1, wherein said recording state changing section writes on an overwriting basis in said adjacent region a mark having a width narrower than that of a mark written in said adjacent region.

6. The information storage apparatus according to claim 1, wherein said recording state changing section writes on an overwriting basis in said adjacent region a mark with power weaker than power used when a mark is written in said adjacent region.

7. The information storage apparatus according to claim 1, wherein said recording state changing section changes a recording state in an adjacent region after evacuating information recorded in said adjacent region and restores said evacuated information in said adjacent region after again reading a mark in said failed region by said mark reading section.

8. The information storage apparatus according to claim 1, wherein said information storage medium includes an alternative region, said recording state changing section performing evacuation of information recorded in said adjacent region to said alternative region and registration of use of said alternative region instead of said adjacent region before changing a recording state in said adjacent region.

* * * * *